United States Patent
Decker et al.

(10) Patent No.: US 6,913,830 B2
(45) Date of Patent: Jul. 5, 2005

(54) COATING COMPOSITIONS CONTAINING SEMICONDUCTOR COLORANTS

(75) Inventors: Eldon L. Decker, Gibsonia, PA (US); Mark D. Merritt, Cranberry Township, PA (US); Calum H. Munro, Wexford, PA (US); Noel R. Vanier, Wexford, PA (US); Rachel B. Wilson, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 8 days.

(21) Appl. No.: 10/640,976

(22) Filed: Aug. 14, 2003

(65) Prior Publication Data

US 2005/0034634 A1 Feb. 17, 2005

(51) Int. Cl.⁷ .................................... B32B 5/16
(52) U.S. Cl. .................. 428/403; 428/404; 428/407; 428/328
(58) Field of Search ................. 428/403, 404, 428/407, 328

(56) References Cited

U.S. PATENT DOCUMENTS

| | | | |
|---|---|---|---|
| 5,190,583 A | 3/1993 | Menzel et al. | |
| 5,215,580 A | 6/1993 | Elfenthal et al. | |
| 5,470,910 A | 11/1995 | Spanhel et al. | |
| 5,527,386 A * | 6/1996 | Statz | 106/481 |
| 5,534,056 A | 7/1996 | Kuehnle et al. | |
| 5,693,447 A * | 12/1997 | Takeyama et al. | 430/201 |
| 5,756,197 A * | 5/1998 | Statz et al. | 428/323 |
| 5,932,309 A * | 8/1999 | Smith et al. | 428/46 |
| 6,514,446 B1 * | 2/2003 | Smith et al. | 264/299 |
| 6,576,355 B2 * | 6/2003 | Yadav et al. | 429/12 |
| 6,602,543 B2 * | 8/2003 | Yadav et al. | 427/126.1 |
| 6,607,821 B2 * | 8/2003 | Yadav et al. | 428/323 |
| 6,653,701 B1 * | 11/2003 | Yamazaki et al. | 257/414 |
| 6,756,120 B2 * | 6/2004 | Smith et al. | 428/404 |
| 6,790,583 B2 * | 9/2004 | Kawazu | 430/198 |

FOREIGN PATENT DOCUMENTS

| WO | WO 99/26299 A1 | 5/1999 |
|---|---|---|
| WO | WO 00/09446 A1 | 2/2000 |

* cited by examiner

*Primary Examiner*—L. Kiliman
(74) *Attorney, Agent, or Firm*—William J. Uhl

(57) ABSTRACT

A protective and decorative coating composition including semiconductor particulate colorants which in combination with a resinous composition produce a desired color. The colorants are semiconductor particles which exhibit sized-quantized absorption of visible light and have a particle size of up to about 12 nm.

9 Claims, 2 Drawing Sheets

COATING COMPOSITIONS CONTAINING SEMICONDUCTOR COLORANTS

BACKGROUND OF THE INVENTION

1. Field of the Invention

The present invention relates to coating compositions containing semiconductor colorants, more particularly to coating compositions containing semiconductor colorants exhibiting sized-quantization of their electronic properties, such that they absorb light in narrow bandwidths within the visible spectrum.

2. Prior Art

Paint compositions typically include colorant particles dispersed in a resinous binder. The paint composition may further include reflective pigments such as aluminum flake or mica or other effect pigment compositions, or substrate-hiding materials such as titanium dioxide or zinc oxide or lead oxide. The colorant particles used in conventional paints are typically on the order of 0.5 micron in size. Particles of this size absorb light at certain wavelengths and scatter light at other wavelengths. This partial absorption and partial scattering creates a degraded coloration effect when viewed by an observer. Selection of a particular color for a paint requires blending of such colorants and is difficult to achieve using conventional colorants because the colorants have spectral characteristics that overlap one another and because the degrading scattering effects are compounded. As a result, conventional paint compositions typically require blending mixtures selected from tens or even hundreds of various colorants in order to achieve a desired paint color. To create a paint color on demand, paint suppliers maintain numerous colorants on hand to be able to blend any combination of colorants.

Accordingly, a need remains for colorants for use in decorative and protective coating compositions applied to substrates which exhibit narrow absorbance bandwidths in the visible spectrum.

SUMMARY OF THE INVENTION

The present invention includes paint compositions containing a resinous binder and semiconductor particulate colorants dispersed therein. The colorants are sized up to about 12 nm or about 1 to about 6 nm. The semiconductor may contain an element from Group IB, IIA, IIB, IIIA, IIIB, IVA, IVB, VA, VB, VIA or VIIB of the periodic table of elements. A particularly suitable element is copper, and the colorants may be particles of copper oxide or copper sulfide. The coating composition may also include substrate-hiding materials.

DESCRIPTION OF THE PREFERRED EMBODIMENTS

For purposes of the description hereinafter, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention includes a coating composition containing a resinous binder and semiconductor particulate colorants which exhibit sized-quantized absorption of visible light with optional substrate-hiding materials. The concentration of the colorants in the coating composition is about 0.001 to about 50 wt.% or about 0.001 to about 20 wt.%. When present, the concentration of substrate-hiding materials in the coating composition is about 0.001 to about 50 wt.% or about 0.001 to about 20 wt.%. These components are described in turn below.

Colorants

The colorants of the present invention are particles of semiconductors which exhibit sized-quantized absorption of visible light and may be characterized as quantum dots.

Figure 1:
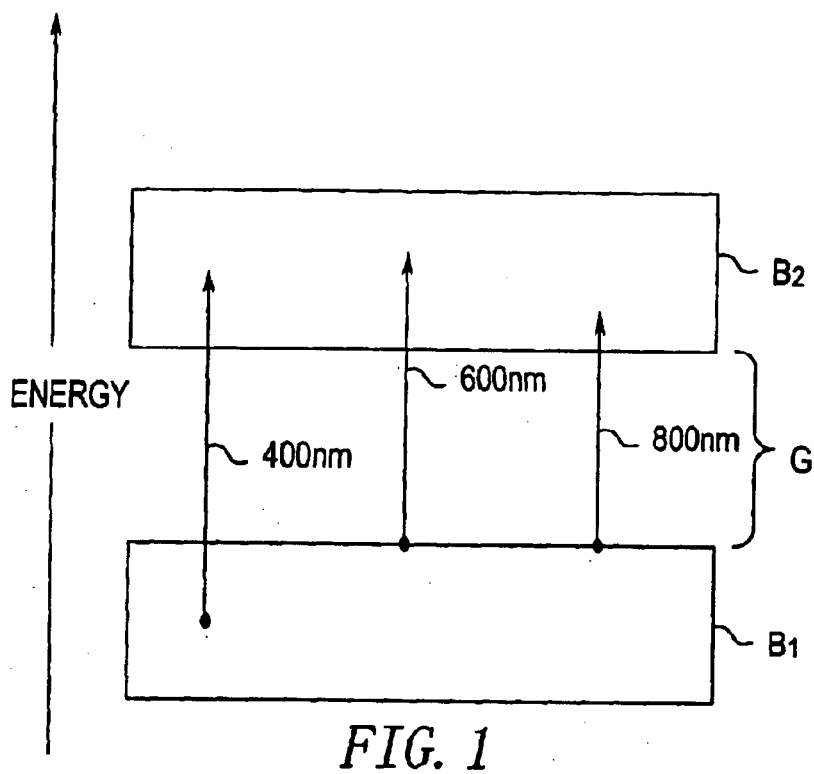
FIG. 1 is a schematic of the energy band gap for conventional semiconductors.

FIG. 1 is a schematic of the valence and conduction bands for a bulk semiconductor particle, which does not exhibit size quantization. The allowed electronic states within the relatively wide bands $B_1$ and $B_2$ are continuous (not discrete), and the band gap G, mostly void of allowed electronic states, lies between $B_1$ and $B_2$. When such a particle is illuminated with visible (white) light (about 400 to about 700 nm in wavelength), the particle absorbs energy of various wavelengths of light. The wavelength of light is inversely proportional to the energy thereof. The energy of the light creates electron-hole pairs in the particle. This causes electrons to go from states in the lower energy valence band $B_1$ to states in the higher energy conduction band $B_2$ across the band gap G therebetween and, in conjunction, this causes holes from states in the band $B_2$ to go to states in the band $B_1$. The arrows indicate excitation of electrons to the higher energy states. When the bands $B_1$ and $B_2$ are relatively wide and the gap G is on the order of the energy of visible light, low energy light (long wavelengths of light) as well as high energy light (short wavelengths of light) induce excitation of electrons across the band gap G. Absorption of long and short wavelengths of light creates a blend of perceived colors. By example, FIG. 1 depicts significant absorption of light from about 400 nm to about 700 nm. A particle which significantly absorbs light over that range of wavelengths does not exhibit size quantization and would not exhibit a clean color.

Figure 2:
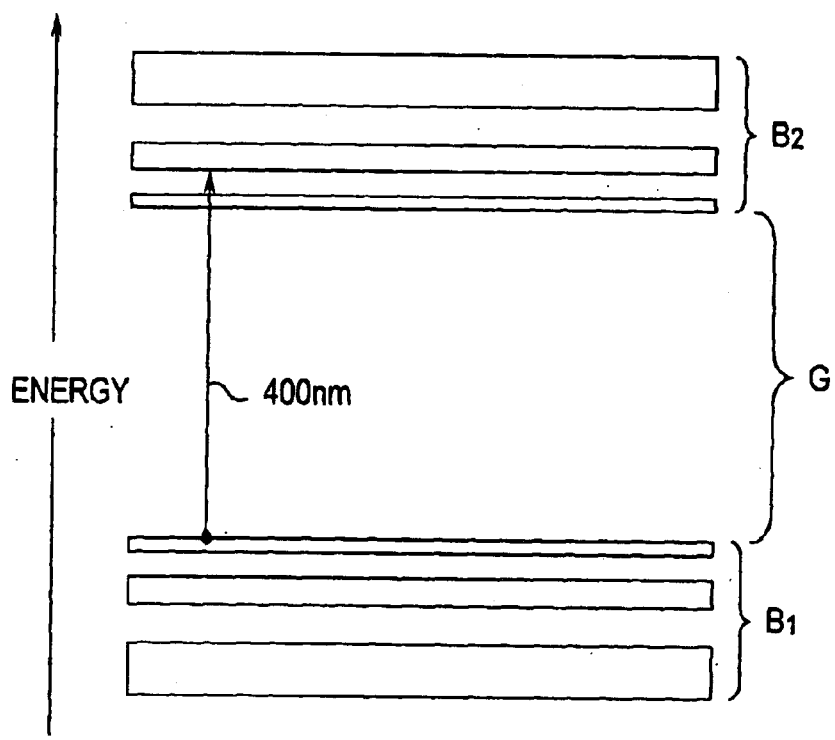
FIG. 2 is a schematic of the energy band gap for particulate semiconductor colorants of the present invention.

However, if due to the small size of a semiconductor particle the particle exhibits confinement of the electron-hole pairs that are produced by the absorption of energy, the particle is said to exhibit size quantization. Size quantization occurs in semiconductor particles that measure up to about 100 nm in diameter. Suitable diameter size ranges of nano-sized semiconducting particles (quantum dots) that absorb light in the visible spectrum are about 1 to about 30 nm or about 1 to about 12 nm or about 1 to about 6 nm. A representation of the result of size quantization in semiconducting particles is shown in FIG. 2. Namely, bands $B_1$ and $B_2$ are no longer continuous, but rather contain discrete electronic energy levels. Therefore, the opportunity for excitation of electrons between energy levels in the bands $B_1$ and $B_2$ is reduced to a set of discrete energy differences corresponding to narrow bandwidths of absorbed visible light. As a result, size quantization in such quantum dots causes them to exhibit clean colors. In addition, the small size of the colorants of the present invention in a coating composition minimizes undesirable scattering of light.

Suitable semiconductors for use in the present invention include metal compounds of Group IB, IIA, IIB, IIIA, IIIB, IVA, IVB, VA, VB, VIA or VIIB of the periodic table of elements, such as copper and germanium. Examples of suitable copper compounds are copper oxide and copper sulfide.

The colorants may be prepared by solid state reactions or in reverse micelle processing. An example of a solid state reaction to produce copper oxide colorants for use in the present invention involves reaction of copper chloride in an ethanol slurry with sodium hydroxide in an ethanol slurry. The size of the copper oxide particles produced in the reaction is controlled by reaction time. The reaction may also be controlled in a reverse micelle process where surfactant micelles act as the reactor vessel and physically limit the growth of the copper oxide particles.

Resinous Binder

The decorative and protective coating composition of the present invention includes a resinous binder. Conventional resinous binders may be used with the colorants described herein in automotive OEM compositions, automotive refinish compositions, industrial coatings, architectural coatings, electrocoatings, powder coatings, coil coatings, and aerospace coatings.

Suitable resinous binders include a curable coating composition including components such as hydroxyl or carboxylic acid-containing acrylic copolymers and hydroxyl or carboxylic acid-containing polyester polymers and oligomers and isocyanate or hydroxyl-containing polyurethane polymers, or amine or isocyanate-containing polyureas which can enhance cure rate, appearance and other physical properties of the cured coating.

The acrylic polymers, if used, are typically copolymers of acrylic acid or methacrylic acid or hydroxyalkyl esters of acrylic or methacrylic acid such as hydroxyethyl methacrylate or hydroxypropyl acrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl or carboxylic acid functionality.

Besides acrylic polymers, the curable coating composition of the present invention can contain a polyester polymer or oligomer. Such polymers may be prepared in a known manner by condensation of polyhydric alcohols and polycarboxylic acids. Suitable polyhydric alcohols include ethylene glycol, neopentyl glycol, trimethylol propane, and pentaerythritol.

Suitable polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an anhydride of a dicarboxylic acid such as hexahydrophthalic anhydride with a diol such as neopentyl glycol in a 1:2 molar ratio.

Where it is desired to enhance air-drying, suitable drying oil fatty acids may be used and include those derived from linseed oil, soya bean oil, tall oil, dehydrated castor oil or tung oil.

The polyesters are made to contain free terminal hydroxyl and/or carboxyl groups that are available for further crosslinking reactions.

Polyurethane polymers containing terminal isocyanate or hydroxyl groups may also be used. The polyurethane polyols or NCO-terminated polyurethanes that can be used are those prepared by reacting polyols including polymeric polyols with polyisocyanates. The polyurea-containing terminal isocyanate or primary or secondary amine groups which can be used are those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates are those described in U.S. Pat No. 4,046,729 at column 5, line 26 to column 6, line 28, hereby incorporated by reference. Examples of suitable polyols are those described in U.S. Pat No. 4,046,729 at column 7, line 52 to column 10, line 35, hereby incorporated by reference. Examples of suitable polyamines are those described in U.S. Pat. No. 4,046,729 at column 6, line 61 to column 7, line 32 and in U.S. Pat. No. 3,799,854 at column 3, lines 13 to 50, both hereby incorporated by reference.

Suitable curing agents for the curable coating composition include aminoplast resins and phenoplast resins and mixtures thereof as curing agents for OH and COOH, and amide and carbamate functional group-containing materials. Examples of aminoplast and phenoplast resins suitable as curing agents in the curable compositions of the present invention are those described in U.S. Pat. No. 3,919,351 at col. 5, line 22 to col. 6, line 25, hereby incorporated by reference.

Polyisocyanates and blocked polyisocyanates as curing agents for OH and primary and/or secondary amino group-containing materials are well known in the art. Examples of polyisocyanates and blocked isocyanates suitable for use as curing agents in the curable compositions of the present invention are those described in U.S. Pat. No. 4,546,045 at col. 5, lines 16 to 38; and in U.S. Pat. No. 5,468,802 at col. 3, lines 48 to 60, both hereby incorporated by reference.

Anhydrides as curing agents for OH and primary and/or secondary amino group-containing materials are well known in the art. Examples of anhydrides suitable for use as curing agents in the curable compositions of the present invention are those described in U.S. Pat. No. 4,798,746 at col. 10, lines 16 to 50; and in U.S. Pat. No. 4,732,790 at col. 3, lines 41 to 57, both hereby incorporated by reference.

Polyepoxides as curing agents for COOH functional group-containing materials are well known in the art. Examples of polyepoxides suitable for use as curing agents in the curable compositions of the present invention are those described in U.S. Pat. No. 4,681,811 at col. 5, lines 33 to 58, hereby incorporated by reference.

Polyacids as curing agents for epoxy functional group-containing materials are well known in the art. Examples of polyacids suitable for use as curing agents in the curable compositions of the present invention are those described in U.S. Pat. No. 4,681,811 at col. 6, line 45 to col. 9, line 54, hereby incorporated by reference.

Polyols, that is material having an average of two or more hydroxyl groups per molecule, can be used as curing agents for NCO functional group-containing materials and anhydrides and esters and are well known in the art. Examples of said polyols are those described in U.S. Pat No. 4,046,729 at col. 7, line 52 to col. 8, line 9; col. 8, line 29 to col. 9, line 66; and in U.S. Pat. No. 3,919,315 at col. 2, line 64 to col. 3, line 33, both hereby incorporated by reference.

Polyamines can also be used as curing agents for NCO functional group-containing materials and for carbonates and unhindered esters and are well known in the art. Examples of polyamines suitable for use as curing agents in the curable compositions of the present invention are those described in U.S. Pat No. 4,046,729 at col. 6, line 61 to col. 7, line 26, hereby incorporated by reference.

The decorative and protective coating composition may be used as a single coating, as a clear top coating composition, as a base coating in a two-layered system, as layers of a multi-layered system including a clear top coating composition, colorant layer and base coating composition, or as a primer layer.

Substrate-Hiding Materials

The decorative and protective coating composition of the present invention may include substrate-hiding materials. The hiding materials are preferably in platelet form and include graphite, alumina, mica, or a scattering member such as described in U.S. patent application Ser. No. 10/165,056, filed Jun. 7, 2002, entitled "Use of Nanoparticulate Organic Pigments in Paints and Coatings", incorporated herein by reference.

The invention will further be described by reference to the following examples.

EXAMPLES

Example 1

Example 1A

Figure 3:
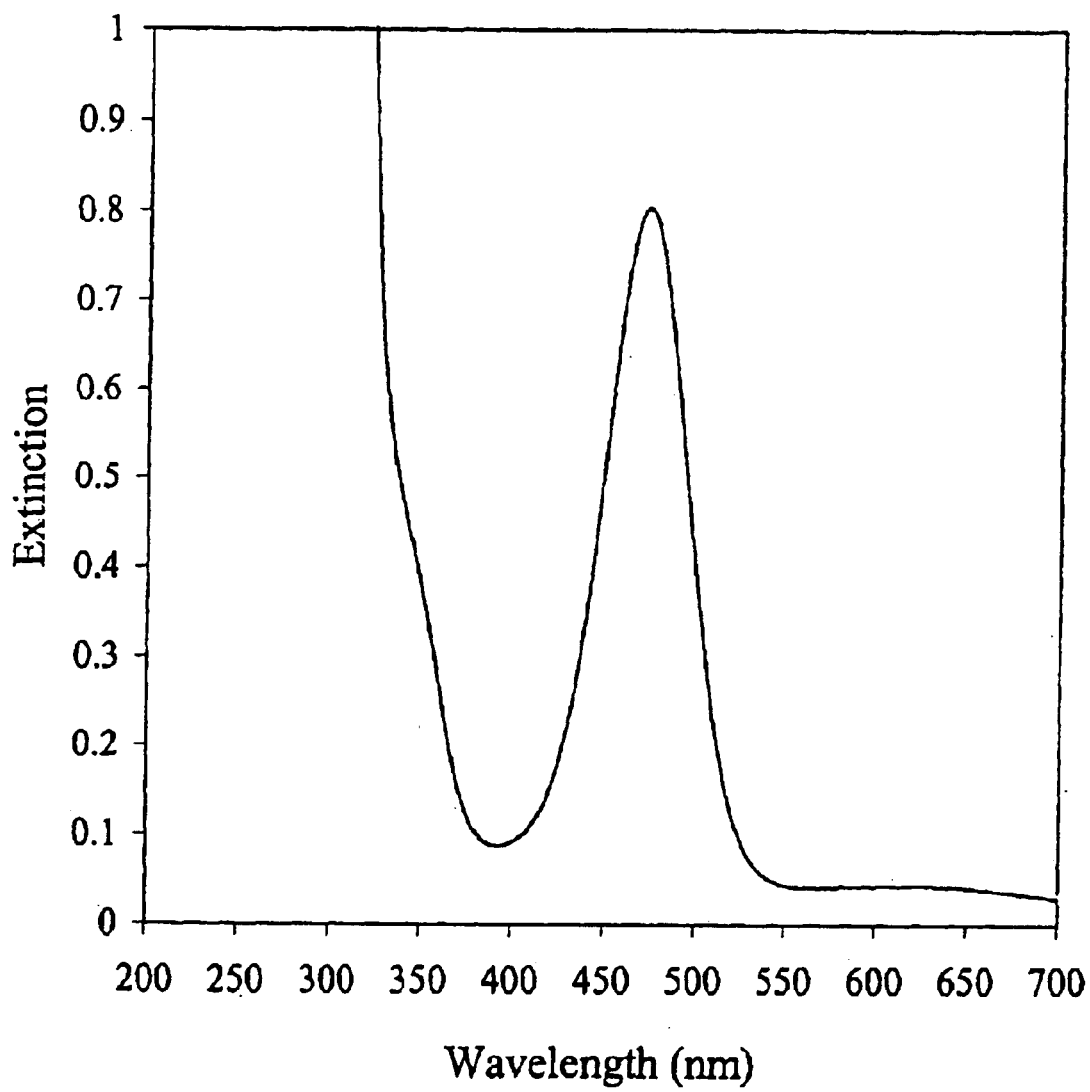
FIG. 3 is a visible light absorbance spectrum for a colorant made in accordance with the present invention.

A colorant of the present invention was prepared by mixing 21.00 g of 1.6 m Triton X-100 in cyclohexane with another 140.22 g of cyclohexane. The solution was split into two equal portions, portion A and portion B. Thiourea (4.32 ml, 0.6 m) in deionized water was added to portion A. Aqueous $NH_4OH$ (25%) was added to a sample of copper(ii) acetate in deionized water, and the pH was adjusted to 11 to produce a copper(ii) ammonia complex. The solution of copper(ii) ammonia complex (4.32 ml, 0.6 m) was added to portion B. 2-Methyl-1-propanol (55.80 g) was added to each portion followed by sonication of both portions for four minutes to yield a thiourea-containing microemulsion (portion A) and a copper-containing microemulsion (portion B). With vigorous stirring, portion A was added to portion B, and the reaction was stirred for 30 minutes and after 24 hours yielded a dispersion of a yellow colorant. One to two milliliters of the dispersion was filtered through a 2 micron PTFE filter into a 10 mm pathlength optical cell. The ultraviolet and visible light extinction of the films of the dispersion was evaluated using a model lambda 2 spectrophotometer (Perkin Elmer Corporation, Norwalk, Conn.). The ultraviolet-visible extinction spectrum (i.e., light not transmitted due to absorbance, scattering, and/or reflection) of the filtered dispersion is shown in FIG. 3 and exhibited a sharp absorbance band centered at approximately 475 nm with a spectral band width at half the maximum value of absorbance of approximately 50 nm. The extinction spectrum also exhibited only minor scattering in the visible and ultraviolet spectral regions.

Example 1B

An organic premix was prepared by mixing the components of Table 1:

TABLE 1

| Component | Weight (g) |
| --- | --- |
| Octanol | 63.2 |
| Ethylene glycol monohexyl ether | 188.0 |
| Byk 031[1] | 9.2 |
| Tinuvin 1130[2] | 17.2 |
| Phosphatized epoxy[3] | 4.7 |
| Cymel ® 327[4] | 127.7 |

TABLE 1-continued

| Component | Weight (g) |
| --- | --- |
| Acylaminomethylene phosphonate | 28.5 |
| 50% Aqueous DMEA | 6.2 |

[1]BYK 031 is an emulsion of paraffin-based mineral oils and hydrophobic components used as a defoamer available from Byk Chemie.
[2]TINUVIN 1130 is a substituted benzotriazole UV light absorber available from Ciba Geigy Corporation.
[3]Phosphatized epoxy prepared from EPON ®828, which is a polyglycidyl ether of Bisphenol A, available from Shell Oil and Chemical Co., reacted with phosphoric acid at an 83:17 weight ratio.
[4]CYMEL ® 327 is a partially methylated melamine resin available from Cytec Industries.

Example 1C

An aqueous, unpigmented film-forming composition was prepared by mixing the components of Table 2:

TABLE 2

| Component | Weight (g) |
| --- | --- |
| Organic premix of Example 1B | 88.9 |
| Latex[5] | 80.2 |
| SHELLSOL ® D25[6] | 11.5 |
| Deionized water | 225.3 |
| Polyurethane/acrylic dispersion[7] | 92.2 |
| Polyacrylic dispersion EPL 6920[8] | 141.1 |
| Ethylene glycol monohexyl ether | 12.7 |
| 50% Aqueous dimethylethanolamine | 2.5 |

[5]Prepared according to U.S. Pat. No. 5,510,148 (Example 1).
[6]SHELLSOL D25 - Mineral spirits available from Shell Chemical Company.
[7]The polyurethane/acrylic dispersion was prepared by producing a polyurethane prepolymer by blending dimethylolpropionic acid (34.9 parts); DESMODUR ® W methylene-bis-(4-cyclohexyl diisocyanate (140.3 parts, Bayer Corp., Pittsburgh, PA); DDI 1410 dimer isocyanate (81.3 parts, Henkel Corp., CITY, ST); FORMREZ ® 66-56 1,6-hexanediol adipate (199.5 parts, Witco Corp.); MPEG 2000 methoxy polyethylene glycol (50.3 parts, Union Carbide, Inc.); dibutyltin dilaurate (0.4 parts); and N-methyl pyrrolidone (130.2 parts) and heated at 90° C. until the NCO equivalent weight reached 1079. The prepolymer was cooled to 35° C. and methyl methacrylate (197.9 parts), butyl acrylate (136.8 parts), and ethylene glycol dimethacrylate (14.0 parts) were added, followed by N,N-dimethylethanolamine (23.2 parts). This mixture was dispersed into deionized water (2372.1 parts) containing diethylenetriamine (18.7 parts) at 40° C. over 20 minutes and was held at 40° C. for 15 minutes. The dispersion was passed through a MICROFLUIDIZER ® emulsifier at 8000 psi and heated to 60° C. A solution of ammonium persulfate (1.28 parts) in deionized water (99.4 parts) was slowly added to the dispersion, and the temperature was adjusted to 80° C. and held for 30 minutes. The resulting polymer dispersion had a solids content of approximately 25 percent.
[8]Polyacrylic dispersion EPL 6920 available from Akzo Nobel.

Example 1D

An aqueous film-forming composition containing the colorant of Example 1A was prepared by mixing together the components of Table 3:

TABLE 3

| Component | Weight (g) |
| --- | --- |
| Colorant of Example 1A | 0.0034 |
| Water | 0.99 |
| Aqueous composition of Example 1C | 4.0 |

Example 1E

An aliquot of the film-forming material of Example 1D was applied by draw down bar over a steel substrate, precoated with a white coating, to a final dry film thickness of about 40 μm. The coating was flashed at room temperature for 10 minutes and baked at 141° C. for 25 minutes. The coated sample had an attractive appearance and desirable yellow coloration.

Example 2

Example 2A

Another colorant of the present invention was prepared under an inert atmosphere (nitrogen) using conventional airless techniques. A stock micellar solution (255 ml) containing 0.96 M deionized water and 0.12 M dioctyl sulfosuccinate, sodium salt (AOT) in heptane was added to a 500 ml round bottom reaction vessel, followed by 80 μl, 1.0 M $Cd(ClO_4)_2$ in deionized water to yield a cadmium-containing microemulsion. The resultant mixture was sonicated for several minutes.

In a separate 50 ml flask, 19 μl of bis(trimethylsilyl) selenide was added to 20.0 ml of the stock AOT micellar solution, sonicated for several minutes and transferred to the cadmium-containing microemulsion in the 500 ml round bottom reaction vessel, with stirring, to yield a clear orange-red solution. Aqueous $Cd(ClO_4)_2$ (36 μl, 1.0 M) was added dropwise to the orange-red solution in the reaction vessel, followed by additions of 11 μl benzenethiol in 5.0 ml heptane and 1.0 ml pyridine resulting in precipitation of a brightly colored precipitate. The precipitate was washed on a fine frit with copious quantities of heptane followed by petroleum ether then dried in air to afford a dark red-black free flowing powder.

Example 2B

A film-forming composition comprising the colorant of Example 2A was prepared by mixing together the components of Table 4:

TABLE 4

| Component | Weight (g) |
|---|---|
| Colorant of Example 2A | 0.023 |
| Pyridine | 0.5 |
| DCU2042[9] | 7.70 |
| DT870[10] | 1.79 |
| DCX61[11] | 1.00 |

[9]Concept ® DCU2042 is a low VOC automotive clear coating composition available from PPG Industries, Inc., Strongsville, Ohio.
[10]DT870 is an automotive coating reducer available from PPG Industries, Inc.
[11]DCX61 is a high solids automotive coating hardener available from PPG Industries, Inc.

Example 2C

An aliquot of the film-forming composition of Example F was spray applied over a steel substrate precoated with a white basecoat to a final dry film thickness of about 40 μm. The coating was dried at room temperature for 30 minutes. The coated sample had an attractive appearance and desirable red coloration.

Example 3

Example 3A

Example 2A was repeated using 0.24 M AOT instead of 0.12 M AOT in the stock micellar solution. This afforded a bright yellow-orange solution and a dark orange-red free flowing powder following treatment with the $Cd(ClO_4)_2$ solution.

Example 3B

A film-forming composition containing the colorant of Example 3A was prepared by mixing together the components of Table 5:

TABLE 5

| Component | Weight (g) |
|---|---|
| Colorant of Example 3A | 0.027 |
| Pyridine | 0.5 |
| DCU2042 | 9.04 |
| DT870 | 2.11 |
| DCX61 | 1.68 |

Example 3C

An aliquot of the film-forming material of Example 3B was spray applied over a steel substrate precoated with a white basecoat to a final dry film thickness of about 40 μm. The coating was dried at room temperature for 30 minutes. The coated sample had an attractive appearance and desirable orange coloration.

Example 4

Example 4A

Example 2A was repeated using 0.36 M AOT instead of 0.12 M AOT in the stock micellar solution. This afforded a bright yellow solution and a yellow-orange free flowing powder following treatment with $Cd(ClO_4)_2$ solution.

Example 4B

A film-forming composition containing the colorant of Example 4A was prepared by mixing together the components of Table 6:

TABLE 6

| Component | Weight (g) |
|---|---|
| Colorant of Example 4A | 0.014 |
| Pyridine | 0.5 |
| DCU2042 | 4.69 |
| DT870 | 1.09 |
| DCX61 | 0.63 |

Example 4C

An aliquot of the film-forming material of Example 4B was spray applied over a steel substrate precoated with a white basecoat to a final dry film thickness of about 40 μm. The coating was dried at room temperature for 30 minutes. The coated sample had an attractive appearance and desirable yellow coloration.

Example 5

Example 5A

Another colorant of the present invention was prepared under an inert atmosphere (nitrogen) using conventional airless techniques. A stock micellar solution (255 ml) containing 0.96 M deionized water and 0.12 M dioctyl sulfosuccinate, sodium salt (AOT) in heptane was added to a 500 ml round bottom reaction vessel, followed by 80 μl 1.0 M $Cd(ClO_4)_2$ in deionized water to yield a cadmium-containing microemulsion. The resultant mixture was sonicated for several minutes. In a separate 50 ml flask, 19 μl of bis(trimethylsilyl)selenide was added to 20.0 ml of the stock AOT micellar solution, sonicated for several minutes and transferred to the cadmium-containing microemulsion in the 500 ml round bottom reaction vessel, with stirring, to yield a clear orange-red solution.

In a separate 50 ml flask, 240 μl of 10 M $Zn(ClO_4)_2$ in deionized water was added to 40 ml of the stock micellar solution and sonicated for several minutes to yield a zinc microemulsion. In another separate 50 ml flask, 167.7 μmol $Na_2S$ was added to 40 ml of the stock micellar solution and sonicated for several minutes to produce a sulfur microemulsion. The zinc and sulfur microemulsions were added to the clear orange-red solution in the 500 ml reaction vessel in alternating aliquots over a three minute period. Aqueous $Zn(ClO_4)_2$ (80 μl, 1.0 M) was added dropwise to the reaction mixture, followed by additions of 34 μl of benzenethiol in 10.0 ml heptane, and 1.0 ml of pyrdine resulting in a colored precipitate. The precipitate was washed on a fine frit with copious quantities of heptane followed by petroleum ether and dried in air to afford a dark red free flowing powder.

Example 5B

A film-forming composition containing the colorant of Example 5A was prepared by mixing together the components of Table 7:

TABLE 7

| Component | Weight (g) |
| --- | --- |
| Colorant of Example 5A | 0.025 |
| Pyridine | 0.5 |
| DCU2042 | 8.37 |
| DT870 | 1.95 |
| DCX61 | 1.08 |

Example 5C

An aliquot of the film-forming material of Example 5B was spray applied over a steel substrate precoated with a white basecoat to a final dry film thickness of about 40 μm. The coating was dried at room temperature for 30 minutes. The coated sample had an attractive appearance and desirable red coloration.

Example 6

Example 6A

Example 5A was repeated using 0.36 M AOT instead of 0.12 M AOT in the stock micellar solution. This afforded a bright yellow solution and a yellow free flowing powder after treatment with $Zn(ClO_4)_2$ and $Na_2S$.

Example 6B

A film-forming composition containing the colorant of Example 6A was prepared by mixing together the components of Table 8:

TABLE 8

| Component | Weight (g) |
| --- | --- |
| Colorant of Example 6A | 0.022 |
| Pyridine | 0.5 |
| DCU2042 | 7.37 |

TABLE 8-continued

| Component | Weight (g) |
| --- | --- |
| DT870 | 1.72 |
| DCX61 | 0.96 |

Example 6C

An aliquot of the film-forming material of Example 6B was spray applied over a steel substrate precoated with a white basecoat to a final dry film thickness of about 40 μm. The coating was dried at room temperature for 30 minutes. The coated sample had an attractive appearance and desirable yellow coloration.

Example 7

Example 7A

Another colorant of the present invention was prepared under an inert atmosphere (nitrogen) using conventional airless techniques. Copper chloride (350.0 grams) was mixed with 1983.0 grams of ethanol in a 2 liter glass reactor. The mixture was stirred continuously and chilled in an ice bath. A 30% by weight aqueous solution of sodium hydroxide (471.6 grams) was added to the mixture via an addition funnel over 20 minutes. The reaction yielded a dispersion of a yellow colorant. Transmission electron micrographs showed the colorant to have a primary particle size of 4 nm.

Example 7B

An organic premix was prepared by mixing the components of Table 9:

TABLE 9

| Component | Weight (g) |
| --- | --- |
| Octanol | 63.2 |
| Ethylene glycol monohexyl ether | 188.0 |
| Byk 031 | 9.2 |
| Tinuvin 1130 | 17.2 |
| Phosphatized epoxy | 4.7 |
| Cymel ® 327 | 127.7 |
| Acylaminomethylene phosphonate | 28.5 |
| 50% Aqueous DMEA | 6.2 |

Example 7C

An aqueous, unpigmented film-forming composition was prepared by mixing the components of Table 10:

TABLE 10

| Component | Weight (g) |
| --- | --- |
| Organic premix of Example 7B | 88.9 |
| Latex | 80.2 |
| SHELLSOL ® D25 | 11.5 |
| Deionized water | 225.3 |
| Polyurethane/acrylic dispersion | 92.2 |
| Polyacrylic dispersion EPL 6920 | 141.1 |
| Ethylene glycol monohexyl ether | 12.7 |
| 50% Aqueous dimethylethanolamine | 2.5 |

Example 7D

An aqueous film-forming composition containing the colorant of Example 7A was prepared by mixing together the components of Table 11:

TABLE 11

| Component | Weight (g) |
|---|---|
| Colorant of Example 7A | 0.0034 |
| Water | 0.99 |
| Aqueous composition of Example 7C | 4.0 |

Example 7E

An aliquot of the film-forming material of Example 7D was applied by draw down bar over a steel substrate, precoated with a white coating, to a final dry film thickness of about 40 μm. The coating was flashed at room temperature for 10 minutes and baked at 141° C. for 25 minutes. The coated sample had an attractive appearance and desirable yellow coloration.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A coating composition comprising a resinous binder and colorants dispersed therein, said colorants comprising semiconductor particles which exhibit sized-quantized absorption of visible light.

2. The coating composition of claim 1, wherein said semiconductor particles are sized up to about 12 nm.

3. The coating composition of claim 1, wherein said semiconductor particles are sized about 1 to about 6 nm.

4. The coating composition of claim 1, wherein said particles comprise an element of Group IB, IIA, IIB IIIA, IIIB, IVA, IVB, VA, VB, VIA or VIIB of the periodic table of elements.

5. The coating composition of claim 4, wherein said particles comprise a copper compound.

6. The coating composition of claim 5, wherein said copper compound is copper oxide or copper sulfide.

7. The coating composition of claim 1, wherein said colorants comprise about 0.001 to about 50 wt. % of the composition.

8. The coating composition of claim 1, further comprising substrate-hiding materials.

9. A coated article comprising a substrate and the coating composition of claim 1.

* * * * *